United States Patent [19]

Yamamoto et al.

[11] Patent Number: 5,409,515
[45] Date of Patent: Apr. 25, 1995

[54] FILTER APPARATUS AND FILTER ELEMENT

[75] Inventors: Katsutoshi Yamamoto; Osamu Tanaka; Osamu Inoue; Toshio Kusumi; Shinichi Chaen; Jun Asano; Nobuki Uraoka, all of Settsu, Japan

[73] Assignee: Daikin Industries, Ltd., Osaka, Japan

[21] Appl. No.: 117,129

[22] PCT Filed: Jan. 13, 1993

[86] PCT No.: PCT/JP93/00038

§ 371 Date: Sep. 14, 1993

§ 102(e) Date: Sep. 14, 1993

[87] PCT Pub. No.: WO93/13849

PCT Pub. Date: Jul. 22, 1993

[30] Foreign Application Priority Data

Jan. 14, 1992 [JP] Japan ................. 4-005167

[51] Int. Cl.⁶ ............................................. B01D 29/21
[52] U.S. Cl. ................................. 55/341.1; 55/382; 55/487; 55/520; 55/521; 55/524
[58] Field of Search ...................... 96/8, 10–13; 55/341.1, 341.2, 350.1, 381, 382, 486, 487, 520, 521, 523, 524

[56] References Cited

U.S. PATENT DOCUMENTS

| | | | |
|---|---|---|---|
| 1,898,027 | 2/1933 | Winslow | 55/520 X |
| 2,853,154 | 9/1958 | Rivers | 55/341.1 |
| 3,653,188 | 4/1972 | Fisher et al. | 55/341.2 X |
| 3,695,007 | 10/1972 | Farnworth | 55/341.1 X |
| 4,324,574 | 4/1982 | Fagan | 55/524 X |
| 4,398,931 | 8/1983 | Shevlin | 55/341.1 |
| 4,663,041 | 5/1987 | Miyagi et al. | 55/521 X |
| 4,765,893 | 8/1988 | Kohlheb | 55/520 X |
| 4,767,426 | 8/1988 | Daly et al. | 55/524 X |
| 4,861,353 | 8/1989 | Wyss | 55/341.1 X |
| 4,902,417 | 2/1990 | Lien | 55/520 X |
| 4,902,419 | 2/1990 | Shibata et al. | 96/8 X |
| 4,968,333 | 11/1990 | Ellis et al. | 55/341.1 |
| 5,073,259 | 12/1991 | Solimar | 55/341.1 X |
| 5,108,474 | 4/1992 | Riedy et al. | 55/521 X |
| 5,154,827 | 10/1992 | Ashelin et al. | 96/12 X |
| 5,234,739 | 8/1993 | Tanaru et al. | 428/131 |

FOREIGN PATENT DOCUMENTS

| | | |
|---|---|---|
| 3425027 | 1/1985 | Germany . |
| 3939645 | 6/1991 | Germany ................ 55/341.1 |
| 52-18481 | 2/1977 | Japan . |
| 55-24575 | 2/1980 | Japan . |
| 60-14902 | 1/1985 | Japan . |
| 60-61018 | 4/1985 | Japan . |
| 60-68027 | 4/1985 | Japan . |
| 61-422 | 1/1986 | Japan . |
| 63-9201 | 1/1988 | Japan . |
| 2-26605 | 1/1990 | Japan . |
| 3-34967 | 5/1991 | Japan . |
| 746380 | 3/1956 | United Kingdom ........ 55/341.1 |
| 2220588 | 1/1990 | United Kingdom ........ 55/341.1 |

OTHER PUBLICATIONS

"Development of High-Function Filter" (pp. 40–41), Osaka Chemical Research Series, vol. 5, No. 9, Osaka Chemical Marketing Center-Partial English Translation.

*Primary Examiner*—Robert Spitzer
*Attorney, Agent, or Firm*—Wenderoth, Lind & Ponack

[57] ABSTRACT

A filter apparatus that is compact and that provides a large filtration area includes filter elements each constructed in cylindrical form by spirally winding a filter medium. Such medium includes a porous membrane of a polytetrafluoroethylene having a pore diameter of 0.1 to 5 μm and low pressure loss and one or a pair of sheets composed of fibers made of a thermally melting synthetic resin. One end of the cylindrical filter element is connected to a respective through hole in a rigid support plate, and the opposite end is blocked.

10 Claims, 10 Drawing Sheets

FILTER APPARATUS AND FILTER ELEMENT

BACKGROUND OF THE INVENTION

The present invention relates to a filter apparatus and filter element for use with the filter apparatus, and more particularly to a filter apparatus preferably provided as an HEPA (High Efficiency Particulate Air), ULPA (Ultra-Low Penetration Air) or super ULPA filter apparatus and a filter element therefor.

Along with recent advances in scientific technologies and changes of life style, clean spaces and purified air have been increasingly required. It is natural that purified air is desired in hospitals and homes, and various air cleaners are used thereof. This also is true in precision instrument and food industries. Furthermore, in fabrication of integrated circuits and semiconductors, pharmaceuticals and manufacture of such medical products as artificial organs, an allowable amount of dust is much less than that in usual clean spaces, and generally an HEPA filter, preferably a ULPA filter and more preferably a filter apparatus classified as a super ULPA filter are required.

Such a filter apparatus used for air cleaning is adapted to have a filter element consisting of a filter material through which air is passed so that such air is cleaned and dust is removed therefrom.

An example of such filter element is illustrated in perspective view in FIG. 18. Such filter element 1 consists of a filter material 3 which is a filter medium bent or folded to form plural folds or ridges 2, for example, a filter cloth of fiberglass. Additionally, spacers 4 generally are placed between the ridges in order to uniformly position the filter material (only two spacers are illustrated). A filter apparatus is formed by air-tightly fitting the circumference of the filter element 1 in a rectangular frame (not shown). The air passing through the filter apparatus flows in a direction from the right rear, as shown in FIG. 18, and passes through the filter material to the left front. Such a filter element is described, for instance, in pp. 40 to 41 of "Development of high-function filter" (Osaka Chemical Research Series, Vol. 5, No. 9, Osaka Chemical Marketing Center).

A concept of filtration area is one standard for evaluating the performance of a filter apparatus. More specifically, the performance of a filter apparatus is measured by filtration area per unit volume of a filter element. Generally, for obtaining higher performance with less pressure loss, a filter element having the largest possible filtration area with the smallest possible size is preferred.

In the filter element 1 of FIG. 18, the total area of filter material 3 corresponds to the filtration area. In order to increase the filtration area of a filter element in such structure to improve the performance of the filter apparatus, a spacing between the ridges or folds, that is a pitch (length p in FIG. 18), is generally reduced to a minimum so that the ridges are formed in wrinkle-like shape.

However, in many cases reduction of the pitch p is disadvantageous. Thus, reduction of the pitch p is limited by the flexibility of the material itself, which depends on types of filter materials used. Also, adjacent filter materials (or a filter material and separator when a separator is provided) may be in contact with each other when the pitch is reduced excessively, whereby air passages needlessly are narrowed, the result being an increase of pressure loss.

For example, when an unwoven fiberglass cloth conventionally used for air filters is employed as a filter material for a filter element of the structure shown in FIG. 18, such unwoven cloth being 0.5 mm in thickness, the limit of the pitch is considered to be about 5 mm. Therefore, with a filter element 610 mm×610 mm in frontage (lengths a×b in FIG. 18) and 150 mm in depth (length c of FIG. 18), the filtration area is approximately 16 m².

In addition, when fiberglass is used as a filter material, fine dust is caused from the fiberglass (Japanese Unexamined Patent Publication No. 3-34967). Thus, it is not an optimum material for obtaining clean air.

SUMMARY OF THE INVENTION

Hence, it is an object of the invention to provide a filter apparatus and a filter element that are compact, that present a larger filtration area at less pressure loss, and that cause no dust.

The invention provides a filter apparatus comprising a support plate having multiple through holes and cylindrical filter elements each having one end connected to a respective through hole in the support plate and an opposite closed end.

The invention also provides a filter apparatus comprising a support plate having multiple through holes and cylindrical filter elements and having both opposite ends thereof connected to respective through holes in the support plate.

Additionally, the invention provides a filter element constructed in cylindrical shape and comprising:

a porous membrane made of polytetrafluoroethylene having a mean pore diameter of 0.1 to 5 μm and a pressure loss of 10 to 200 mmH$_2$O when air is forced to penetrate therethrough at a flow velocity of 5.3 cm/sec; and a reinforcement sheet having a pore diameter larger than the mean pore diameter of the porous membrane and fixedly laminated over the porous membrane.

The invention is also characterized in that the reinforcement sheet is formed by fibers made of a thermally melting synthetic resin, at least in an outer circumferential surface thereof, and thermally fused to the porous membrane.

The invention is further characterized in that the reinforcement sheet is formed by fibers of a core-shell structure comprising a synthetic resin with a low melting point in an outer shell or layer thereof and a synthetic resin with a high melting point in an inner core or layer.

Moreover, the invention is characterized in that the filter element is spirally wound so that the porous membrane is position at the outside of the filter element.

The invention additionally provides a filter element comprising:

a porous membrane; and a sheet made of thermally melting synthetic resin having a pore diameter larger than that of the porous membrane and fixed over the porous membrane;

wherein the filter element is cylindrically formed in such manner that the sheet is positioned at the inside of the filter element, one axial end thereof is crushed, and the sheet is thermally fused together to form a closed end.

Moreover, the invention provides a filter element comprising:

a porous membrane; and a pair of sheets made of thermally melting synthetic resin having a pore diameter larger than that of the porous membrane and fixedly laminated to opposite sides of the porous membrane so that the membrane is positioned between the sheets;

the filter element being cylindrically formed, one axial end thereof is crushed, and an inner sheet of the pair is thermally fused together to form a closed end.

Furthermore, the invention provides a filter apparatus comprising:

a support plate having therein multiple through holes;

cylindrical filter elements each having one axial end inserted into a respective through hole in the support plate, one axial end of the filter element projecting from one side of the support plate, in the direction of the thickness thereof and the other axial end of the filter element projecting and extending from the other side of the support plate and being closed;

a weir being fixed to a surface of the one side of the support plate and surrounding a region of the support plate through which are formed the through holes; and an adhesive filling between the filter elements in the region where the through holes of the support plate are formed.

The invention is still further characterized in that a cylindrical member is fixed to a surface of the other side of the support plate and outwardly surrounds the filter elements.

The invention is yet further characterized in that a region of the support plate outwardly of the region thereof through which the through holes are formed is a mounting flange.

According to the invention, a filter apparatus is constructed by connecting cylindrical filter elements at first ends thereof to multiple through holes that are formed in a support plate and closing the other ends of the filter elements, or by connecting both ends of each cylindrical filter element to respective through holes. Thus, a gas to be filtered is introduced from the through holes and is cleaned as it passes through the filter elements, or the gas is drawn through the filter element in the reverse direction, that is, from outside to inside thereof, cleaned, and discharged from the through holes. Thus, because the filter element is constructed cylindrically and is connected to multiple through holes of the support plate, the entire structure is formed of a compact size, and the filtration of the apparatus is increased.

In addition according to the invention, the filter element is constructed cylindrically of a porous membrane made of polytetrafluoroethylene (PTFE) and a reinforcement sheet for reinforcing the membrane and fixedly laminated thereto. Pores of the membrane have a mean diameter of 0.1 to 5 $\mu$m, and the pressure loss, when air is drawn therethrough at a flow velocity of 5.3 cm/sec, is 10 to 200 mmh$_2$O. Thus, the performance of collecting ultra-fine particles is increased, and pressure loss can be reduced. Besides, the diameter of such cylindrical filter element can be reducible, and a compact size can be realized.

Moreover according to the invention, the reinforcement sheet is formed by fibers at least the outer circumferential surfaces of which are made of a thermally melting synthetic resin. Thus, the sheet can be thermally fused and fixed to the porous membrane, the filter element can be formed cylindrically by thermal fusion, and an elongated cylindrical filter element can be automatically fabricated easily by thermal fusion, particularly by spirally winding in such manner that the reinforcement sheet consisting of fibers made of such thermally melting synthetic resin is positioned inwardly and the porous membrane is positioned outwardly of the cylindrical shape.

Also according to the invention, the reinforcement sheet is formed by fibers of core-shell structure, of which an outer layer or shell, that is a skin layer, is made of a synthetic resin having a low melting point for enabling thermal fusion, and an inner layer, that is a core layer, is made of a synthetic resin having a high melting point. Thus, any shrinkage or deformation of the fibers due to heat during thermal fusion is prevented, and voids that allow gas passage can be secured even after the thermal fusion.

According to the invention, a filter medium of the filter element is formed of a sheet fixedly laminated to the porous membrane, and the sheet has a pore diameter larger than that of the porous membrane, is made of a thermally melting synthetic resin, and may be formed by an unwoven cloth formed of fibers. Since the sheet is cylindrically shaped at the inside of the filter element, one axial end thereof can be crushed together so that it can be thermally fused together to form a closed end. Manufacture of the filter element thereby is facilitated, and the sheet can be used, as described above, for closing one end of the filter element by thermal fusion as well as for reinforcement of the porous membrane. Besides, since the sheet is made of a thermally melting synthetic resin, as described above, when the filter element is constructed by spirally winding in such manner that the sheet is positioned inwardly and the porous membrane is positioned outwardly of the cylindrical shape, or by laminating the porous membrane and the sheet, and thermally fusing and fixing, for example, a rectangular filter medium, manufacture is facilitated.

In addition, a filter medium of another filter element according to the invention has a sandwich structure with a pair of sheets laminated on opposite sides of a porous membrane. Each sheet is made of a thermally melting synthetic resin. The filter medium is cylindrically formed, and the porous membrane therefore is protected by the pair of sheets against damage such as pinholes during such cylindrical forming. Moreover, because the sheets on opposite sides of the porous membrane are thermally fused thereto and formed cylindrically, the adhesive strength can be enhanced. Furthermore, since the sheet inside the filter element that is formed cylindrically is thermally fused when one axial end of the filter element is crushed and closed, fabrication is facilitated, and the porous membrane is protected against damage caused by contact with a mandrel when such filter medium is spirally wound and formed into the cylindrical shape. The sheet outside the filter element that is cylindrically formed protects the porous membrane from damage from external forces and also serves to increase adhesive strength by being thermally fused to the inner sheet, when cylindrically formed as described above.

Also, according to a filter apparatus of the invention, cylindrical filter elements are inserted into multiple through holes formed in the support plate, one axial end of each filter element projects from one side of the support plate in the direction of the thickness thereof, and the other axial end of the filter element projects and extends from the other side of the support plate. Such other end of the filter element is closed. A weir is provided in a surface of the one side in the support plate, and an adhesive is filled in a region which is surrounded by the weir. Thus, outer circumferential surfaces of the filter elements and inner circumferential surfaces of the through holes are air-tightly adhered and closed, thereby preventing any leakage of gas.

By fixing a cylindrical member to a surface of the other side of the support plate to surround outwardly the filter elements, damages to the filter elements due to external forces can be prevented.

Moreover according to the invention, a region of the support plate outside the weir forms a mounting flange. The operation of mounting the filter apparatus of the invention thereby is facilitated.

DETAILED DESCRIPTION OF THE INVENTION

Figure 1:
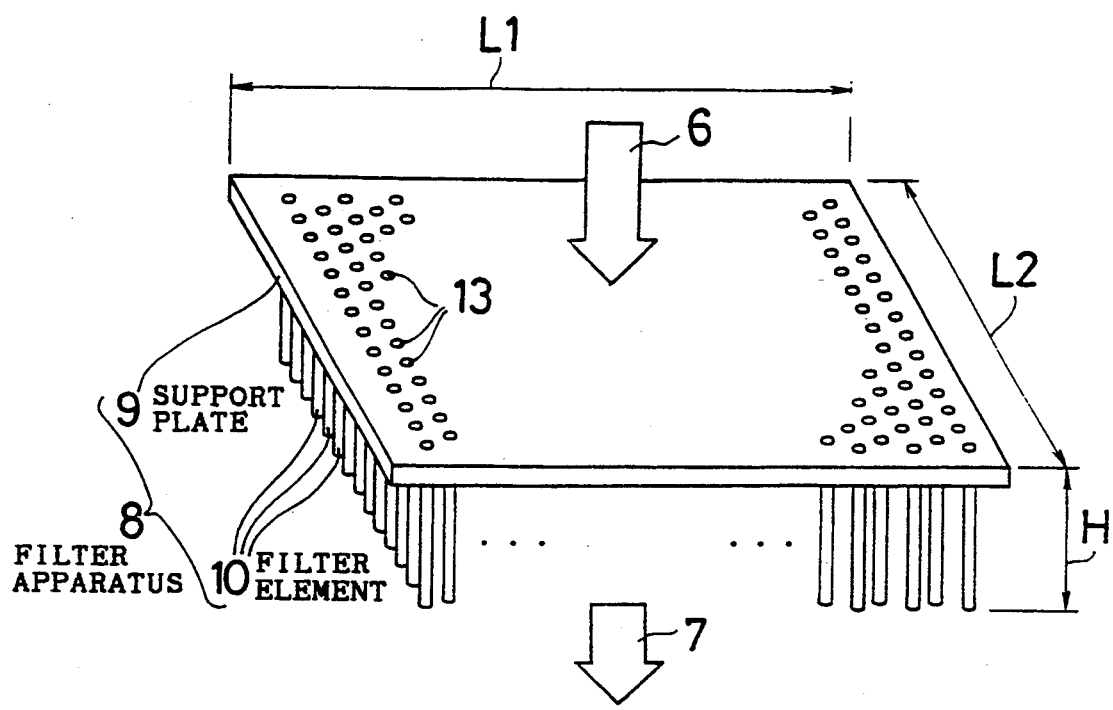
FIG. 1 is a perspective view of a filter apparatus of an embodiment of the invention.
Figure 2:
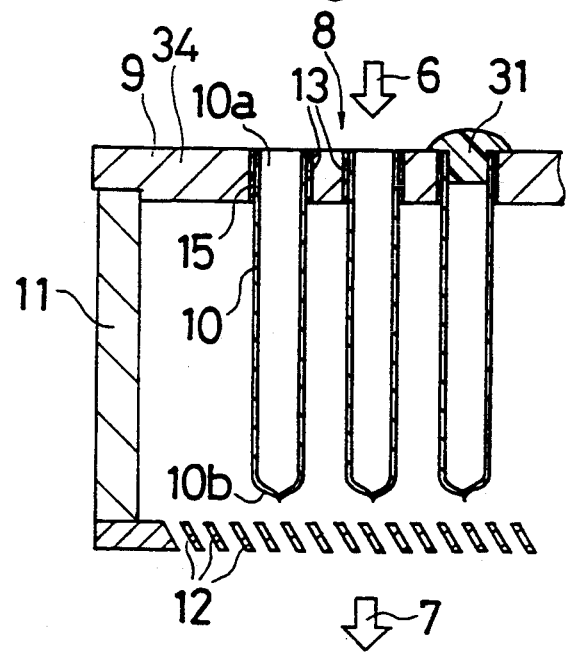
FIG. 2 is an enlarged sectional view showing a part of the filter apparatus of FIG. 1.

FIG. 1 is a perspective view of an embodiment of the invention, and FIG. 2 is an enlarged sectional view showing a part thereof. Filter apparatus 8 is positioned at a ceiling of a super clean room, the air to be cleaned is fed as shown by an arrow 6, and the air thus cleaned is supplied into the room, as shown by an arrow 7, through filter apparatus 8. The filter apparatus 8 basically includes a rigid support plate 9 and plural filter elements 10. The filter apparatus 8 is supported at a peripheral mounting flange 34 thereof by a protecting frame 11 that is a cylindrical member fixed to the ceiling of the room. A ventilation member 12 is mounted at a lower part of frame 11 to provide a more aesthetic appearance. The ventilation member 12 may be provided with plural parallel fins and may be constructed by a punched metal or net material. The ventilation member 12 may be a sheet or film with plural vents formed therein. As shown by the arrow 7, the cleaned air is rectified and supplied into the room by member 12. The mounting flange 34 is formed outside a region of support plate 9 through which holes 13 are formed.

Figure 3:
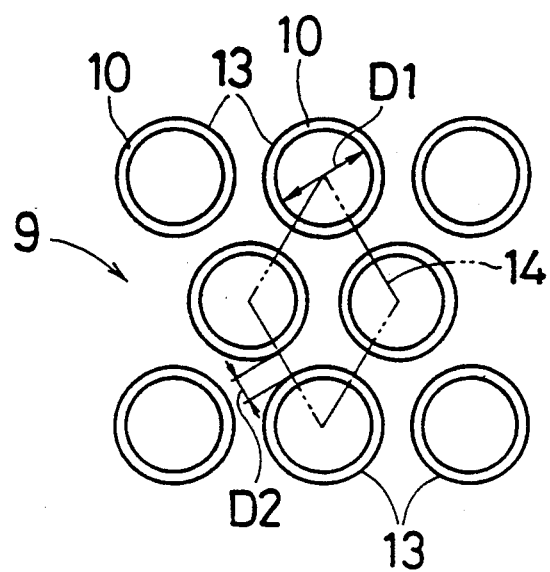
FIG. 3 is a plan view of the filter apparatus.

The support plate 9 of filter apparatus 8 may be made of such synthetic resins as epoxy, urethane, silicon and acrylic, such metals as aluminum and iron, or any other material. Plural through holes 13 are formed in support plate 9, as shown in FIG. 3, in a staggered pattern, for instance. For example, inner diameter D1 of a through hole 13 is typically 4 to 5 mm, minimum spacing D2 between adjacent through holes may be 1 mm, and the axis of each through hole 13 is located at an apex of a rhomboid as shown by dashed lines 14. Although the through holes are arranged in staggered pattern in this embodiment, the axis of each through hole 13 may be located at an apex of a square or rectangle according to another embodiment of the invention. By arranging holes 13 in a staggered pattern as in this embodiment, as many through holes as possible are formed in each unit area of the support plate 9, and the filtration area thereby is increased to the maximum.

According to the invention, the inner diameter of each filter element 10 is, for example, 2 to 20 mm$\phi$, preferably 2 to 10 mm$\phi$. If the inner diameter of filter element 10 is less than 2 mm$\phi$, as described hereinafter with reference to FIG. 7 during manufacture by using a mandrel 23, the mandrel 23 comes to be too thin and is bent, and it is difficult to accurately manufacture the filter element 10. However, when a filter medium 16 has a highly flexible structure, it is possible to prevent bending of the mandrel 23 during manufacture, and the diameter can be further reduced. If the inner diameter of the filter element 10 exceeds 20 mm$\phi$, it is difficult to achieve the objects of the invention by obtaining the largest possible filtration area with the smallest possible size.

One end 10a of the filter element 10 is engaged in a respective through hole 13 and is fixed air-tightly therein by an adhesive 15. The other end 10b of the filter element 10 is, as described hereinafter with reference to FIG. 10, crushed, and closed by means of thermal fusion or the like. Although a vertical length in the axial direction of the filter element 10 in FIG. 2 can be chosen as desired, such length is practically, for instance, about 50 mm or more and less than 300 mm. However, the filter element 10 may be longer, since this only means that the structural resistance of the entire filter apparatus is increased, and extreme elongation is meaningless. The filter element 10 may be formed to have a length shorter than 50 mm.

Figure 4:
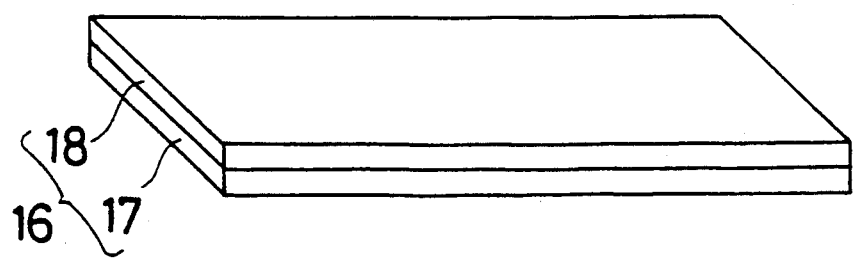
FIG. 4 is a perspective view showing a filter medium of a filter element.
Figure 7:
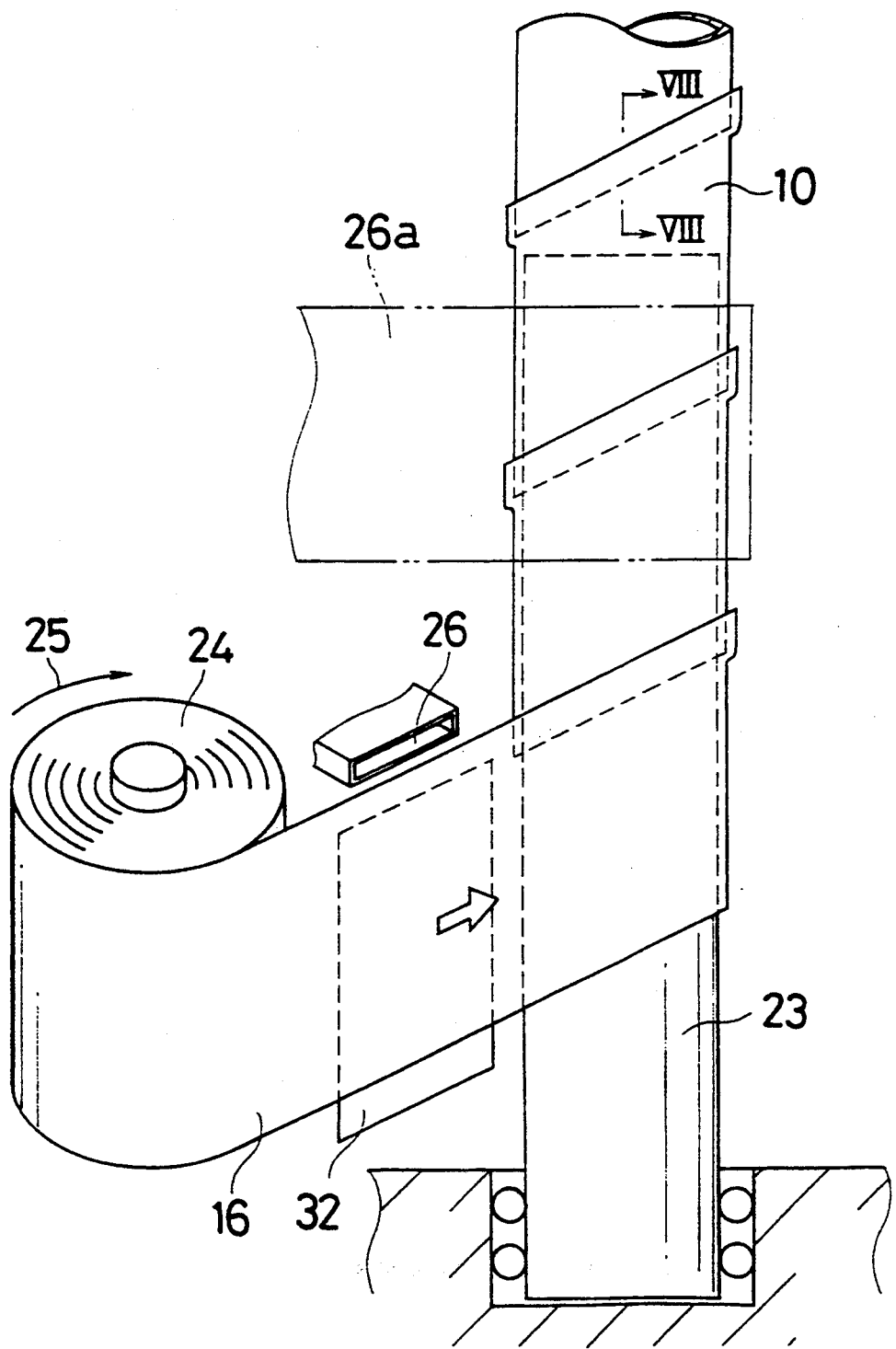
FIG. 7 is a perspective view showing a manufacturing process of a reinforcement sheet by spiral winding.

The filter element 10 is spirally wound as shown in FIG. 7 and as described hereinafter, and is constructed by using a filter medium 16 shown in FIG. 4. The filter medium 16 comprises a porous membrane 17 and a reinforcement sheet 18 that is laminated and fixed with the membrane. The porous membrane 17 is made of material such as PTFE that has a mean pore diameter of 0.1 to 5 $\mu$m, and is capable of providing a pressure loss of 10 to 200 mmH$_2$O, preferably 10 to 100 mmH$_2$O, as shown hereinafter in Table 1, when the air is drawn through it at a flow velocity of 5.3 cm/sec.

In a porous membrane made of such PTFE material, because a half-cured PTFE is elongated to at least 50 times by expansion area magnification in the biaxial direction, and is subjected to a heat treatment at a temperature higher than the melting point of the PTFE, the porous PTFE membrane is dominantly composed of fibrils, that is, the ratio of the area of a fibril to a node by image processing by scanning an electron microscopic is 99:1 to 75:25, the mean fibril diameter is 0.05 $\mu$m to 0.2 $\mu$m, the maximum area of a node is 2 $\mu m^2$ or less, and the mean pore diameter is 0.2 to 0.5 $\mu$m. By means of such porous membrane made of PTFE, 99.9995% of dust particles of 0.1 $\mu$m$\phi$ or more, for example, can be removed.

As described above, the porous member of half-cured PTFE, which is biaxially elongated at least 50 times, preferably 70 times, and more preferably 100 times by expansion are magnification, and cured, has a unique membrane structure consisting of fine fibers that have almost no nodes. Moreover, the mean pore diameter of a porous PTFE membrane fabricated in this manner is very small, generally 0.5 to 0.2 $\mu$m, and the thickness of the membrane is reduced to 1/20 (if the original thickness of half-cured member is 100 $\mu$m, it is reduced to 5 $\mu$m after elongation and curing) to 1/50 of that before drawing.

Preferable ranges and particularly preferable ranges of parameters concerning the porous membrane 17 made of PTFE according to the invention are listed in Table 1.

TABLE 1

|  | Preferable range | Particularly preferable range |
| --- | --- | --- |
| Degree of curing | 0.30–0.80 | 0.35–0.70 |
| Magnification of elongation | MD 2–40 TD 10–100 Total 50–1500 | MD 3–30 TD 15–70 Total 50–1000 |
| Mean pore diameter | 0.2–0.5 $\mu$m | 0.2–0.4 $\mu$m |
| Thickness of membrane | 0.5–15 $\mu$m | 1–10 $\mu$m |
| Fibril/node area ratio | 99/1–75/25 | 99/1–85/15 |
| Mean fibril/diameter | 0.05–0.2 $\mu$m | 0.05–0.2 $\mu$m |
| Maximum area of node | 2 $\mu m^2$ or less | 0.05–1 $\mu m^2$ |
| Pressure loss | 10–100 mm $H_2O$ | 10–70 mm $H_2O$ |

Although a preferable thickness of porous membrane 17 is within a range shown in Table 1, a feasible range according to the invention is within 0.05 to 100 $\mu$m, preferably 0.05 to 10 $\mu$m. In addition, although the mean pore diameter is as shown in Table 1, a feasible range according to the invention is 0.1 to 5 $\mu$m.

Although filter mediums consisting of fiberglass are conventionally known as flat filter mediums, when cylindrical formation of such filter medium of fiberglass is attempted for manufacturing a filter element, the filter medium cannot be smoothly curved, and is angularly bent to form an acute or obtuse angle, resulting in an angular corner. Therefore, such medium causes dust, and dust particles contained in the air to be filtered pass through a relatively large spacing in the angular corner without being filtered. Thus, cleaning of the air is difficult. The filter medium 16 according to the invention is capable of solving such problems.

Methods for measuring properties of the filter medium are described below.

Means pore diameter

A mean flow pore diameter (MFP) measured in accordance with a specification of ASTM F-316-86 was regarded as means pore diameter. Actual measurements were performed by means of Coulter Porometer [manufactured by Coulter Electronics, U.K.].

Thickness of membrane

By using a membrane thickness gauge model 1D-110MH manufactured by Mitsutoyo Co., Ltd., an entire thickness of five porous membranes laminated was measured, and divided by 5, and a value obtained was regarded as thickness of a membrane.

Pressure loss

The porous membrane was cut into a circular shape of 47 mm in diameter, set to a filter holder having an effective penetration area of 12.6 $cm^2$, and subjected to a pressure of 0.4 $kg/cm^2$ at an entrance side thereof, and a pressure loss was measured by a manometer by adjusting the air emitted from an exit side so that the air is allowed to penetrate at a flow velocity of 5.3 cm/sec.

Degree of curing

A degree of curing of a half-cured PTFE member according to the invention is determined by the following method.

Firstly, a sample of 3.0±0.1 mg is weighed and cut from the non-cured PTFE member, and a crystal dissolution curve is obtained by using the sample. Similarly, a sample of 3.0±0.1 mg is weighed and cut from the half-cured PTFE, and a crystal dissolution curve is obtained from the sample.

The crystal dissolution curve is recorded by a differential scanning calorimeter (hereinafter "DSC") such as model DSC-50 made by Shimadzu Corporation. The sample of non-cured PTFE is first placed in an aluminum pan of the DSC, and a heat of dissolution of the non-cured PTFE and that of the cured one are measured according to the following procedure.

(1) The sample is heated to 250° C. at a heating rate of 50° C./min, and then from 250° C. to 380° C. at a rate of 10° C./min. A peak point of an endothermic curve observed during the process is defined as "melting point of non-cured PTFE" or "melting point of fine PTFE powder".

(2) Immediately after being heated to 380° C., the sample is cooled to 250° C. at a cooling rate of 10° C./min.

(3) The sample is heated again to 380° C. at a heating rate of 10° C./min. A peak point of an endothermic curve observed during heating process (3) is defined as "melting point of cured PTFE".

Succeedingly, a crystal dissolution curve is recorded with a half-cured PTFE in accordance with process (1).

Heat of dissolution of non-cured, cured and half-cured PTFEs are proportional to an area between the endothermic curve and baseline, and can be automatically recorded by model DSC-50 made by Shimadzu Corporation, when an analytic temperature is set.

Then, the degree of curing is calculated by the following equation:

$$\text{Degree of curing} = (\Delta H_1 - \Delta H_3)/(\Delta H_1 - \Delta H_2)$$

wherein $\Delta H_1$ is heat of dissolution of the non-cured PTFE, $\Delta H_2$ is heat of dissolution of the cured PTFE, and $\Delta H_3$ is heat of dissolution of the half-cured PTFE.

Image processing

The area ratio of fibril to node, mean fibril diameter and maximum node area were measured by the following method.

A picture of the surface of the porous membrane was taken by a scanning electron microscope (Hitachi model S-4000, evaporation by Hitachi model E1030)

(SEM picture, Magnification at 1000 to 5000). By inputting the picture to an image processor (Image Command 4198, TVIP-4100 of Ratok Engineering Co., Ltd.), and separating it into node and fibril, an image consisted of nodes only and another image of fibers only were obtained. The maximum node area was obtained by processing the image of nodes only, and the mean fibril diameter was obtained by processing the image of fibrils only (by dividing the total area by ½ of the total circumference).

The area ratio of fibril to node was obtained from the ratio of the total area of the fibril image to that of node image.

Figure 5:
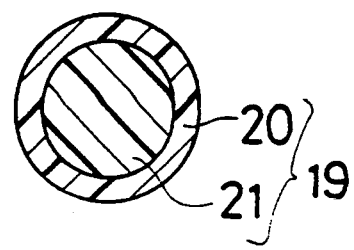
FIG. 5 is a sectional view of a fiber having a coreshell structure, and constituting a reinforcement sheet.

The reinforcement sheet 18 has a pore diameter larger than the mean pore diameter of porous membrane 17, and is fixedly laminated to the porous membrane 17 by thermal fusion or by using an adhesive applied locally. It is preferred that the reinforcement sheet 18 is formed by synthetic fibers 19 having a core-shell structure, and the synthetic fiber 19 comprises, as shown in FIG. 5, an outer shell or layer 20 and an inner core or layer 21. The outer layer 20 is made of a synthetic resin having a low melting point (for example on the order to 120° C.) for thermal fusion. The inner layer 21 is composed of a synthetic resin having a high melting point for avoiding heat shrinkage during thermal fusion and maintaining voids during heating. Such resins are used in combinations 1 to 4 as shown in Table 2.

TABLE 2

| Combination of synthetic fibers 19 | Outer layer 20 | Inner layer 21 |
| --- | --- | --- |
| 1 | Polyethylene | Polyester |
| 2 | Polyester having a low melting point | Polyester |
| 3 | Polypropylene | Polyester |
| 4 | Polyethylene | Polypropylene |

The synthetic fibers 19 having such core-shell structure are made into an unwoven or woven cloth. The outer layer 20 has a lower melting point than the inner layer 21, and thus provides the advantage that the porous membrane 17 can be fixed by thermal fusion without using an adhesive. The inner layer 21 has a higher melting point than the outer layer 20, and causes no shrinkage, because the inner layer 21 remains not melted when the outer layer 20 is dissolved by heat. Thus, there is no such risk that fine voids in the reinforcement sheet 18 are blocked.

Figure 6:
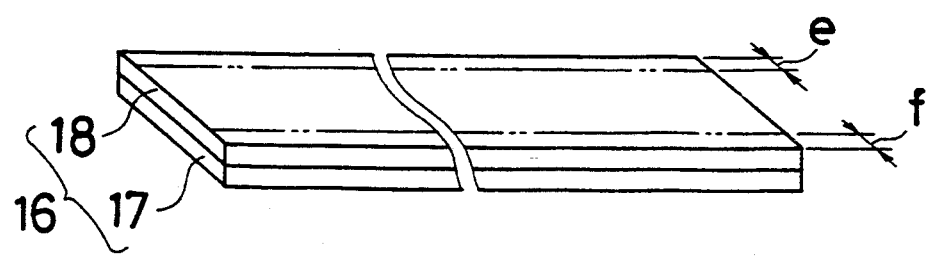
FIG. 6 is a perspective view showing the filter medium of a filter element that is constructed by spiral winding.

FIGS. 6 and 7 are perspective views explaining a manufacturing process of the filter element 10. Lengths 3 and f (in the illustrated embodiment e=f) of end portions in the direction of width of the reinforcement sheet 18 of the filter medium 16 shown in FIG. 6 are spirally wound in thermally fused state as shown in FIG. 7 to form the cylindrical filter element 10. Mandrel 23 is truly cylindrical and is rotatably mounted, as shown in FIG. 7. A roll 24 of the filter medium 16 is spirally wound around the mandrel 23 with a damping force or drag applied in the direction of arrow 25, during which an outer circumferential surface of the filter medium 16 wound around the mandrel 23 is rotated and driven by an endless belt 26a. Hot air is supplied by a nozzle 26 to a region shown in FIG. 6 by the length e at one end in the direction of the width of the filter medium 16 supplied from the roll 24. Thus, the outer layer 20 of synthetic fibers 19 constituting the reinforcement sheet 18 is dissolved and softened, and the filter element 10 is formed. Due to a difference in friction coefficients, i.e. kinetic friction coefficients of the belt 26a and filter medium 16, the filter element 10 is formed in a spirally wound shape. In other words, because a friction drag generated between the belt 26a and filter medium 16 is higher than that between the mandrel 23 and filter medium 16 wound thereabout, the filter element 10 is formed in the spirally wound shape, and is unwound from the mandrel 23.

Figure 8:
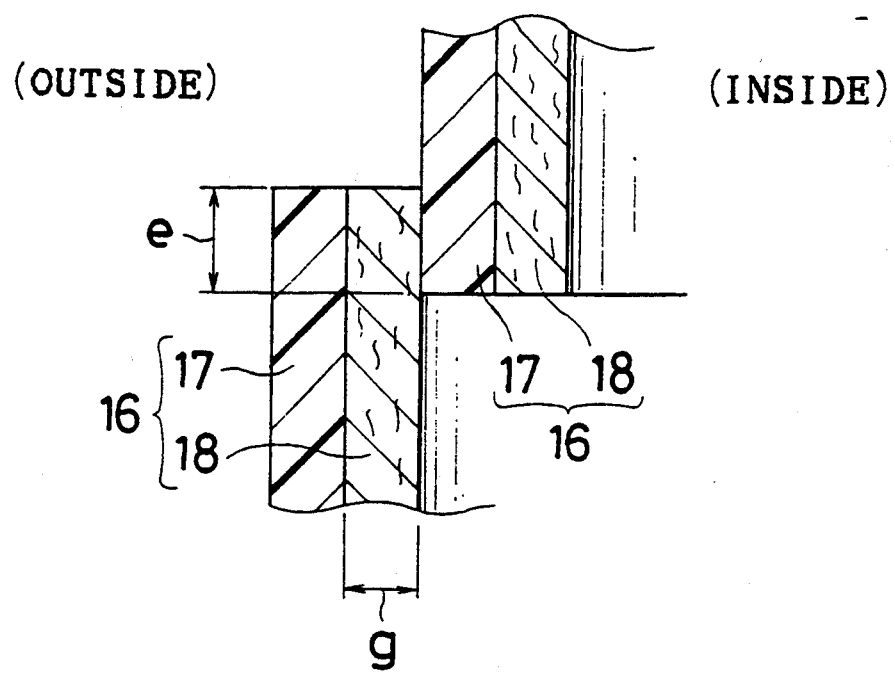
FIG. 8 is a partial sectional view taken along line VIII—VIII of FIG. 7.

FIG. 8 is a partial sectional view taken along sectional line VIII—VIII in FIG. 7. The reinforcement sheet 18 of the filter medium 16 is melted over the length e by the hot air jet from the nozzle 26, is pressed against the porous membrane 17 by the damping force in the direction of arrow 26 that acts on the roll 24, and is fixed by heat and pressure. Because the reinforcement sheet 18 is fixed by heat and pressure over the length e, voids are blocked over the length e, and air-tightness is achieved. Instead of air-tightly blocking the voids of the reinforcement sheet 18 over the length e in the direction of the width of the filter medium 16 as shown in FIG. 8, the length e may be chosen so as to be larger than the thickness g of the reinforcement sheet 18 (e > g).

In order to allow a filter element 10 to be spirally wound and formed in the above manner, the fusion by heat is enabled by placing the porous membrane 17 in the outside, and the reinforcement sheet 18, therefore, in the inside.

An outer diameter of the mandrel 23 is chosen to be 2 to 20 mm$\phi$ in correspondence with a desired inner diameter of the filter element 10 to be formed. When the inner diameter of filter element 10 is small, the mandrel 23 can be bent, and thus, processing becomes difficult. When the inner diameter of filter element 10 is large the filtration area is reduced.

Figure 18:
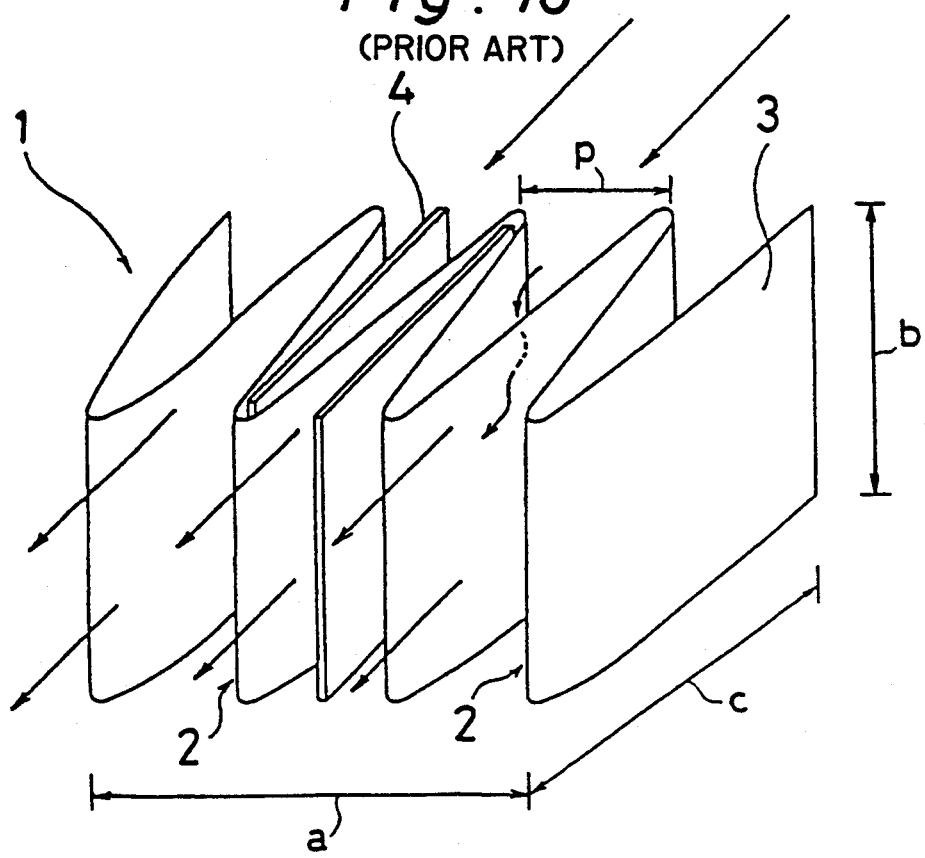
FIG. 18 is a perspective view of a part of a prior art filter element.

In the embodiment shown in FIG. 1, lengths L1×L2 of the support plate 9 are 610 mm×610 mm. Filter elements 10 of length H projecting from the support plate constitute the filter apparatus 8. The filtration area is approximately 23 m² at a setting of D1=4.0 mm and D2=1 mm in FIG. 3. Accordingly, it is confirmed that the filtration area is much larger than the filtration area of 16 m² of the prior art arrangement described above with reference to FIG. 18.

As shown in FIG. 2, by fitting a cap 31 over the end 10a of a filter element 10, some of the multiple filter elements 10 can be selectively closed. In this way, it is possible to close defective filter elements and still obtain effective filtration.

Instead of thermal fusion by a hot air jet from the nozzle 26, in accordance with another embodiment of the invention an adhesive may be applied over a range of the length e.

Figure 9:
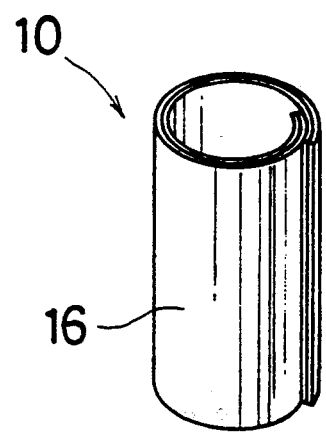
FIG. 9 is a perspective view showing a filter element of another embodiment of the invention.

FIG. 9 is a perspective view partly showing another embodiment of the invention. Alternatively to the spiral winding discussed above, the filter medium 16 can be wound in a truly cylindrical manner in the longitudinal direction perpendicular to the axis of cylinder to be formed. The resultant filter element 10 may be cylindrically formed by fixation through thermal fusion or use of an adhesive.

Figure 10:
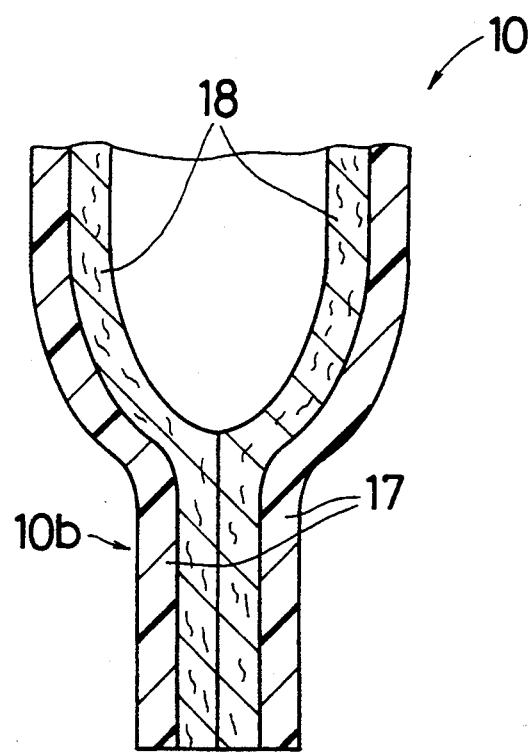
FIG. 10 is an enlarged section showing an end of the filter element.

FIG. 10 is an enlarged sectional view showing a part of an end 10b of the filter element 10. Such axial end of the filter element is crushed, and the sheet 18 constituting the inner layer is thermally fused together and closed air-tightly.

Figure 11:
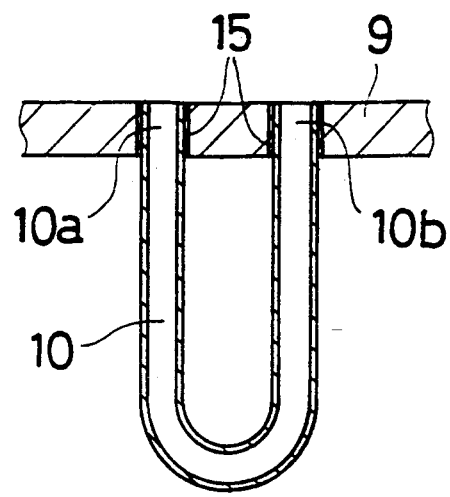
FIG. 11 is a partial sectional view showing a filter apparatus of other another embodiment of the invention.

FIG. 11 is a partial sectional view of a further embodiment of the invention. In this embodiment, both ends 10a, 10b of the filter element are engaged in through holes 15 of support plate 9 and are fixed therein by an adhesive or the like.

Figure 12:
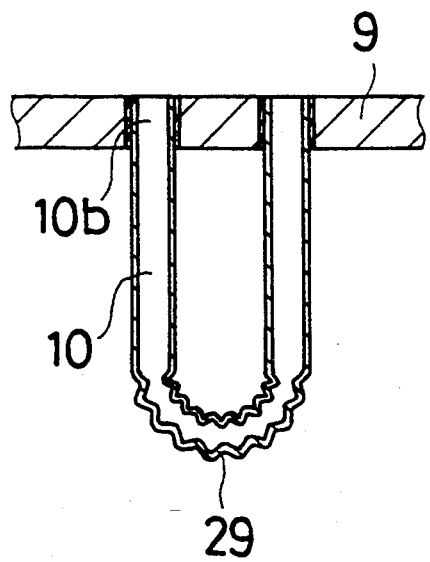
FIG. 12 is a partial sectional view showing a filter apparatus of still another embodiment of the invention.

Still another embodiment of the invention is shown in FIG. 12. In this embodiment, a bellows-like curved portion 29 is formed so that the filter element 10 can be easily bent.

Figure 13:
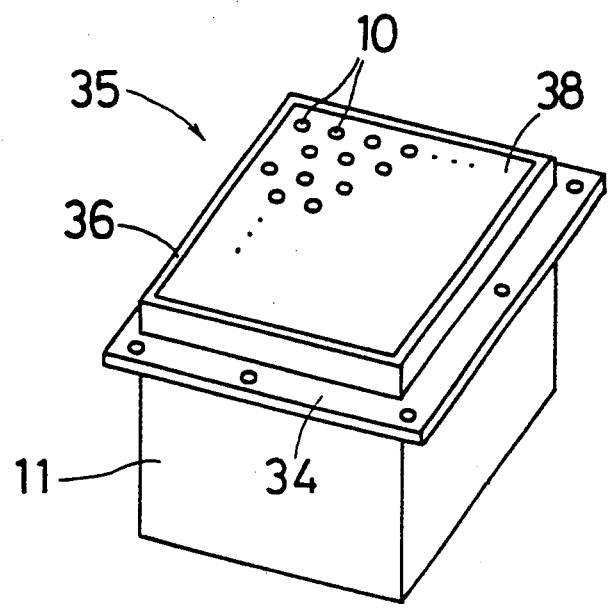
FIG. 13 is a perspective view showing the overall structure of a filter apparatus of another embodiment of the invention.
Figure 14:
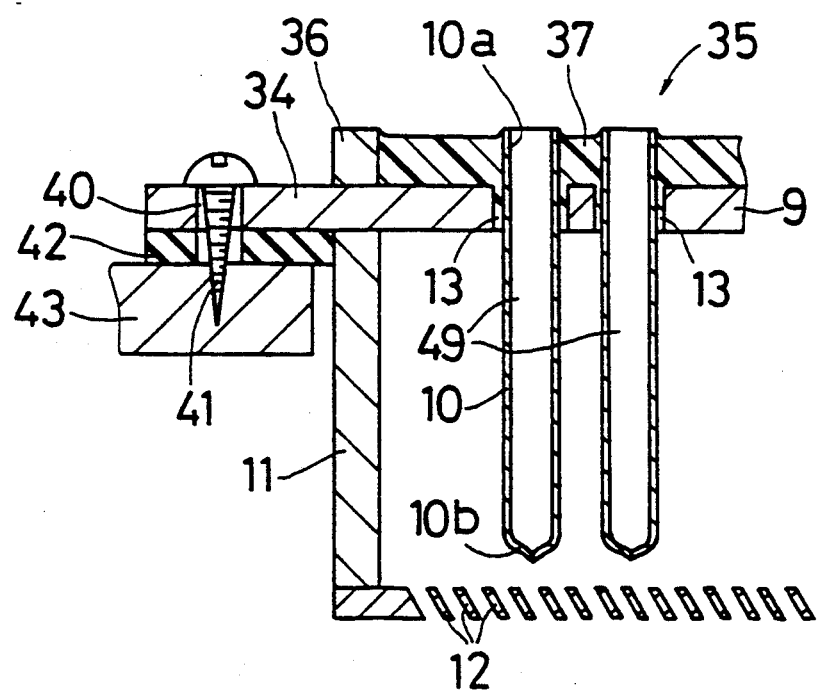
FIG. 14 is a partial sectional view of the filter apparatus shown in FIG. 13.

FIG. 13 is a perspective view showing an entire filter apparatus 35 of an embodiment of the invention, and FIG. 14 is an enlarged sectional view showing a part of the filter apparatus 35. This embodiment is similar to that shown in FIGS. 1 to 10, and corresponding parts are indicated by the same reference numerals. The filter apparatus 35 basically comprises support plate 9 having multiple through holes 13 and cylindrical filter elements 10 inserted through respective through holes 13. One end 10a in the axial direction of each filter element 10 is inserted through the respective through hole 13 and slightly projects from one side (upper side shown in FIG. 14) in the direction of thickness of the support plate 9. The filter element 10 projects and extends from the other side (lower side of FIG. 14) in the direction of thickness of the support plate 9, and the other axial end 10b thereof is closed. Detailed structure of the filter element is identical to that of the embodiment discussed above.

A weir 36, rectangular in plan view, is fixed to a surface of the one side (that is the upper surface in FIG. 14) of the support plate 9. The weir 36 is constructed in a frame-like form and surrounds outwardly a region 37 in which are formed the through holes 13 of the support plate 9.

Figure 15:
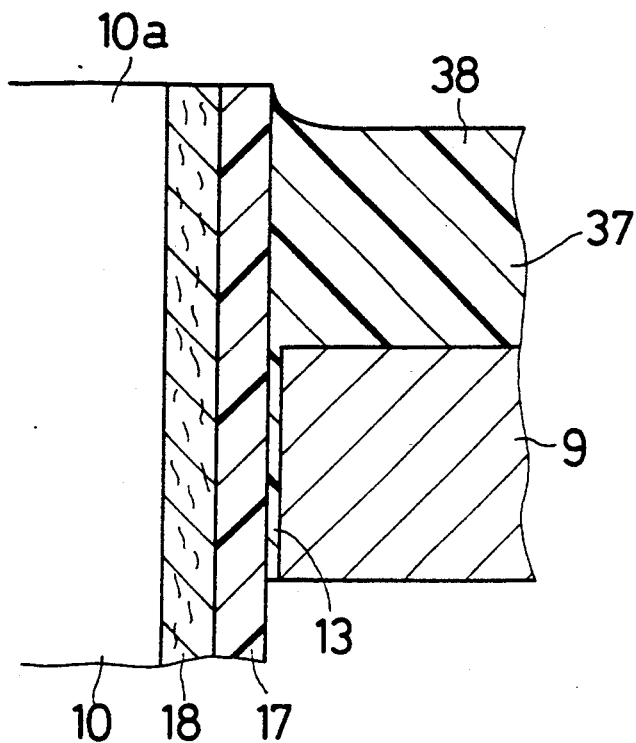
FIG. 15 is an enlarged sectional view of a portion of FIG. 14.

FIG. 15 is an enlarged sectional view of a portion of FIG. 14. In the region 37 surrounded by the weir 36 and having the through holes of the support plate 9 formed therein, an adhesive 38 is applied between the filter elements 10. The adhesive 38 is tightly adhered to the porous membrane 17 that is the outer layer at the end 10a of the filter element 10. Adhesive enters into the through holes 13 and thereby blocks spaces between outer circumferential surfaces of the porous membranes and inner circumferential surfaces of the through holes. This avoids leakage of air to be cleaned from upper side of FIG. 15, and consequently ensure that the air will be securely drawn into the filter elements 10 and filtered thereby. Preferably, the adhesive 38 has such viscosity that it is prevented from flowing downwardly in FIG. 15 out of the spacing between the outer circumferential surface of porous membrane 17 and the inner circumferential surface of the through hole 13. A so-called thixotropic property (shear rate dependency) and epoxy adhesives, for example, are preferred. The viscosity or thixotropic index of the adhesive 38 should be 290 poise, for example.

On a surface (the lower surface in FIG. 14) of the other side in the direction of thickness of the support plate 9 is fixed protection frame 11 that is a cylindrical member. The protection frame 11 outwardly surrounds the filter elements 10 and protects the filter elements 10 by preventing damages thereto caused by external forces.

A region outside the region 37 with the through holes of the support plate 9 formed therein, that is a region outside the weir 36, provides mounting flange 34. Mounting holes 40 are formed in the flange 34, screws 41 are inserted through the mounting holes 40, and the filter apparatus 35 of the invention thus is fixed to a ceiling plate 43 through a gasket 42.

According to still another embodiment of the invention, an absorbent may be filled into the filter element 10, as shown by reference numeral 49 in FIG. 14. The absorbent 49 may be activated carbon powders for deodorization, fibers, absorbents or NOx and SOx, or other absorbents for use of removing gases or fine liquid. By filing an absorbent into the filter element 10 in such manner, undesired gases and fine liquids contained in the air to be cleaned can be removed therefrom, and an arrangement for removing them can be simplified. Although an absorbing means is conventionally interposed in a path for recirculating the air of such a room as a clean room in order to absorb such undesired gases and liquids., such arrangement is bulky. By filling the absorbent 49 into the filter elements 10 as described above, such problem can be solved, and the arrangement can be simplified.

Figure 16:
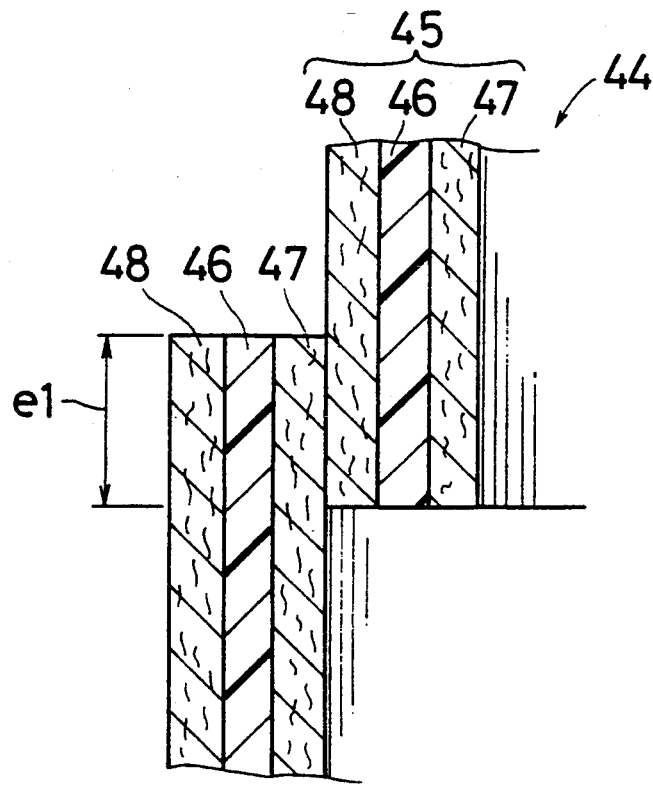
FIG. 16 is a partial sectional view similar to FIG. 8, but showing a filter element of still a further embodiment of the invention.

FIG. 16 is a sectional view showing a part of a filter element 44 of another embodiment according to the invention, and FIG. 16 is similar to FIG. 8 discussed above. A filter medium 45 comprises a porous membrane 46, an inner sheet 47 and an outer sheet 48 that are overlaid on opposite sides of porous membrane 46 and fixed thereto to form a sandwich structure. The porous membrane 46 has a structure similar to the porous membrane 17, and the sheets 47 and 48 have structures similar to the sheet 18. That is, the sheets 47 and 48 have a pore diameter larger than that of the porous membrane 46 and are made of thermally melting synthetic resins. The filter medium 45 is spirally wound and cylindrically formed by a manufacturing method similar to that shown in FIG. 7. In FIG. 16, the inner sheet 47 and the outer sheet 48 of the filter medium 45 are adhered by heat and pressure over a length e1 in the axial direction, voids over a portion of the length e1 are obstructed, and air-tightness is achieved.

According to the filter element 44 shown in FIG. 16, as the porous membrane 46 is arranged between the sheets 47 and 48, the membrane 46 is protected against damages such as pin holes. In addition, since the inner sheet 47 and outer sheet 48 are fused together by heat over the length e1, as described above, the superior effect of enhancement of adhesive strength also can be achieved. This is also true in a structure with the filter medium 45 partly overlapped and fused by heat so as to form a cylindrical shape as shown in FIG. 9. Thus, specifically the outer sheet 48 protects the porous membrane 46 against damage due to external forces, and serves for increasing the adhesive strength upon thermal fusion with the inner sheet 47 as shown in FIG. 16.

Figure 17:
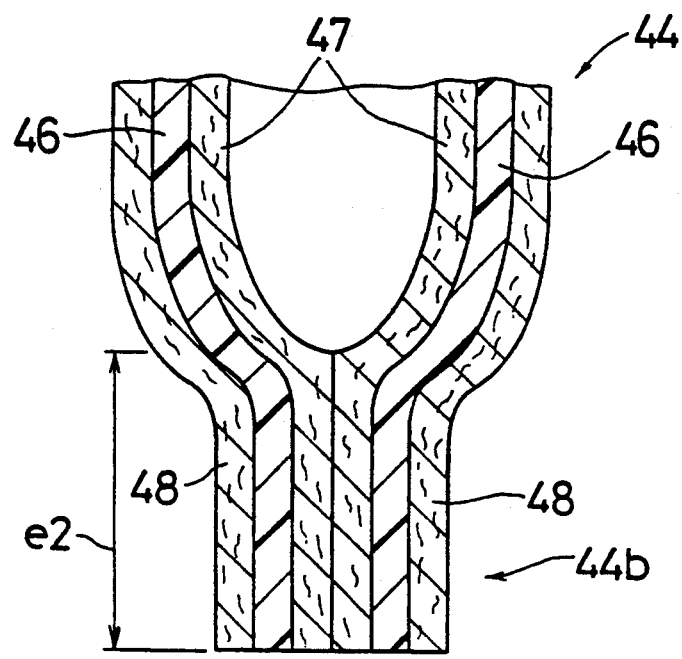
FIG. 17 is an enlarged sectional view showing an end of the filter element shown in FIG. 16.

FIG. 17 is a sectional view showing a lower end 44b of the filter element 44 that is thus formed in a cylindrical shape. The end 44b of filter element 44 is crushed, and the inner sheet 47 of the pair of sheets 47 and 48 is thermally fused together to air-tightly close over a length e2. In this way, the inner sheet 47 carries out the effect of thermal fusion for air-tightly closing the end 44b, and serves for protecting the porous membrane 46 by preventing the porous membrane 46 from directly contacting the mandrel 23 and being damaged when the filter element 44 is spirally wound and formed in a cylindrical shape by using the mandrel 23 as described specifically in connection with FIG. 7.

In the filter element 44 shown in FIGS. 16 and 17, the porous membrane 46 may have a thickness of 10 to 100 μm. Particularly when the thickness of the porous membrane 46 exceeds, for example, 100 μm, the outer sheet 48 can be eliminated, and the filter element has a structure similar to that of the filter element 10 of the previous embodiment. The inner sheet 47 and outer sheet 48 may be 0.10 mm to 0.50 mm in thickness, for instance the inner sheet 47 is 0.26 mm thick and the outer sheet 48 is 0.16 mm thick.

In the embodiment shown in FIGS. 16 and 17, similarly to the previous embodiment, an absorbent 49 may be provided in the filter element 44.

As another embodiment of the invention, the porous membrane may have a structure other than PTFE. For example, it may be an electret membrane consisting of polypropylene fibers.

The filter element 44 shown in FIGS. 16 and 17 can be employed in place of the filter element of FIGS. 1 to 15.

According to the concept of the invention, it is required that the sheets 18, 47 and 48 of the filter elements 10 and 44 be composed of a thermally melting synthetic resin at least in the outer circumferential surface, and the inside thereof may consist of other materials than thermally melting synthetic resins.

Industrial Utilizations

As described above, according to the invention, since the filter apparatus is achieved by connecting cylindrical filter elements to multiple through holes formed in the support plate, it is possible to increase the filtration area with a compact construction and to enable filtering at a low pressure loss.

In addition, according to the invention, the filter element constructed in a cylindrical form has a very small pore diameter. The porous membrane is reinforced with a low pressure loss by the reinforcement sheet. Therefore, it is possible to enhance the performance of collecting superfine particles, reduce pressure loss, and avoid dust emission.

Moreover, according to the invention, the reinforcement sheet is composed of fibers comprising thermally melting synthetic resin, at least at the outer circumferential surface thereof. Thus, a filter element easily can be constructed in a cylindrical form, and an elongated filter element easily can be manufactured by placing the porous membrane on the outside and the reinforcement sheet in the inside and spirally winding them to produce the cylindrical form.

Furthermore, according to the invention, the reinforcement sheet is formed by fibers of core-shell structure in such manner that the outer layer is made of a synthetic resin having a low melting point, and the inner layer is made of a synthetic resin having a high melting point. Any shrinkage and undesired change in shape of fibers in the reinforcement sheet during thermal fusion are thereby prevented, and the filter element can be cylindrically formed with voids in the reinforcement sheet being maintained.

Also according to the invention, because the filter medium is constructed by laminating and fixing a sheet made of a thermally melting synthetic resin with the porous member, and formed cylindrically in such manner that the sheet is inside, and one axial end is crushed, thermally fused, and closed, the porous membrane is protected by the sheet against damage, thermal fusion is enabled by the sheet, and production is facilitated.

Additionally according to the invention, a pair of sheets can be placed at opposite sides of the porous membrane to form a sandwich structure, the sheets being composed of thermally melting synthetic resins. The structure is formed cylindrically, and an inner sheet of the pair is fused together by heat by crushing one axial end.

The porous membrane is thus protected by the pair of sheets and is prevented from being damaged. The sheets forming the inner and outer layers can be thermally fused at the time of cylindrical formation. The adhesive strength can be increased. The sheet forming the inner layer blocks by thermal fusion of one axial end of the filter element and also protects the porous membrane by preventing it from being damaged by a mandrel used to spirally wind and form the cylinder. The sheet forming the outer layer protects the porous membrane by preventing it from being damaged by an external force and serves to increase the adhesive strength by being fused with the inner sheet during formation of the cylinder.

Further according to the invention, one axial end of a cylindrical filter element is inserted through a through hole in the support plate. The filter element projects from one side of the support plate and projects and extends from the other side thereof. The filter element end extending from the other side of the support plate is blocked. A weir is provided on a surface of the one side of the support plate to outwardly surround a region of the support plate having formed therein the through holes. An adhesive is filled into such region surrounded by the weir. Spaces between the outer circumferential surface of each filter element and the inner circumferential surface of the respective through hole thereof therefore are filled with adhesive and air-tightly sealed. Thus, prevention of leakage and flow of air to be cleaned is assured.

Moreover, a cylindrical member is fixed to a surface of the other side of the support plate to outwardly surround the filter elements. Thereby, damage of the filter elements due to external force is securely prevented. Furthermore, a region outside the region of the support plate through which are formed the through holes, that is a region outside the weir, forms a mounting flange. Attachment of the filter apparatus according to the invention to a ceiling or other structures thus is facilitated.

We claim:

1. A filter apparatus comprising:
   a support plate having opposite first and second surfaces, said support plate having a region having formed therein a plurality of apertures extending between said first and second surfaces;
   a plurality of longitudinal filter elements, each said filter element extending through a respective said aperture, with a first axial end of said each filter element projecting axially beyond said first surface of said support plate and with a second axial end of said each filter element projecting and extending axially beyond said second surface of said support plate, said first axial end of each said filter element being open, and said second axial end of each said filter element being sealed;
   a weir attached to said first surface of said support plate and surrounding said region thereof having said apertures formed therein; and
   an adhesive attaching said filter elements to said support plate, said adhesive being filled within said weir and over said first surface of said support plate.

2. A filter apparatus as claimed in claim 1, wherein said adhesive fills spaces between confronting outer surfaces of said filter elements and inner surfaces of said support plate defining respective said apertures.

3. A filter apparatus as claimed in claim 1, further comprising a protecting frame mounted to project from said second surface of said support plate and to surround said filter elements.

4. A filter apparatus as claimed in claim 1, wherein said support plate includes a flange extending outwardly from said region having said apertures formed therein.

5. A filter element having a cylindrical shape and comprising:

a porous membrane made of polytetrafluorethylene having a mean pore diameter of 0.1 to 5 $\mu$m and operable to produce pressure loss of 10 to 200 mm $H_2O$ when air is forced to penetrate said membrane at a flow velocity of 5.3 cm/sec; and a reinforcement sheet fixedly laminated over one side of said porous membrane, said reinforcement sheet having a pore diameter greater than said mean pore diameter of said porous membrane.

6. A filter element as claimed in claim 5, wherein at least an outer circumferential surface of said reinforcement sheet is formed by fibers of thermally melting synthetic resin and is fused to said porous membrane.

7. A filter element as claimed in claim 6, wherein each said fiber comprises a core-shell structure including an inner core layer formed of synthetic resin having a relatively high melting point and an outer shell layer formed of synthetic resin having a relatively low melting point.

8. A filter element as claimed in claim 5, wherein said porous membrane and said reinforcement sheet laminated thereto are spirally wound to form said filter element with said porous membrane forming an exterior thereof.

9. A filter element as claimed in claim 5, wherein said reinforcement sheet includes thermally melting synthetic resin forming an interior of said filter element, and one axial end of said reinforcement sheet is flattened and fused to form a closed end of said filter element.

10. A filter element as claimed in claim 9, further comprising another reinforcement sheet fixedly laminated to an opposite side of said porous membrane, such that said porous membrane is sandwiched between the two reinforcement sheets.

* * * * *